Oct. 30, 1956    W. R. POLYE ET AL    2,768,606
METHOD FOR LIGHTING INDICATING DEVICES
Filed April 29, 1953
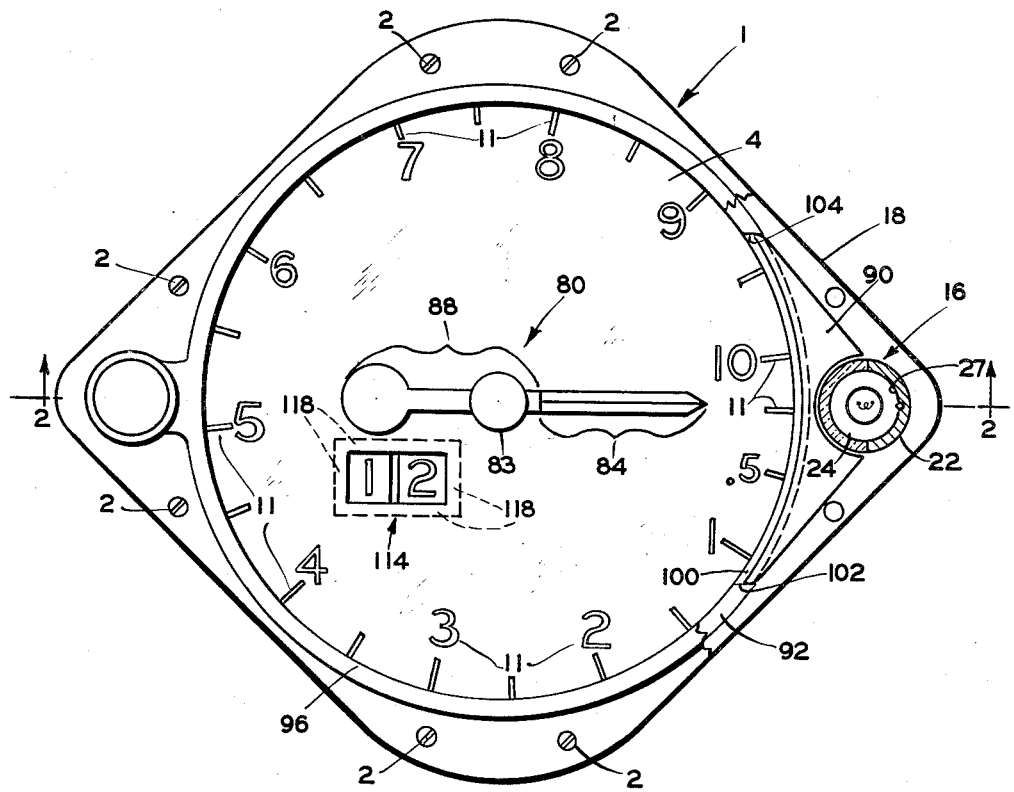
INVENTORS
ANDRE VIRET
WILLIAM R. POLYE
BY Herbert L. Davis
ATTORNEY

United States Patent Office 2,768,606
Patented Oct. 30, 1956

2,768,606

METHOD FOR LIGHTING INDICATING DEVICES

William R. Polye, River Edge, and Andre Viret, Tenafly, N. J., assignors to Bendix Aviation Corporation, Teterboro, N. J., a corporation of Delaware Application April 29, 1953, Serial No. 351,856

3 Claims. (Cl. 116—129)

The present invention relates to a novel device and method for lighting indicating devices particularly of the type capable of being edge illuminated and having a dial, a pointer and counters and including one or more lamp housings and means for transmitting light from the lamp or lamps to the objects to be illuminated including indicia on the dial, the pointer and the counters.

Another object of the invention is to provide an indicating device having an illuminating lamp housing in which there is built into the lamp housing a semi-circular filter of desired color arranged between the lamp and the objects to be illuminated, while the interior of the lamp housing is highly polished so as to provide a light reflector which acts to reflect the light from the lamp filament through the filter so as to increase the intensity of the illumination and direct the light from the lamp so as to pervade a dial plate of suitable transparent material with uniform intensity and illuminate suitable indicia thereon through the plate while illuminating the pointer directly by light rays from the lamp.

Another object of the invention is to provide novel means for eliminating glare from the indicia on the dial by the arrangement of a first ring-like spacer and light shield in the path of the light for directly illuminating the pointer and so arranged as to shield the face of the dial for a short distance from the lamp housing and protect the indicia on and the background of the dial from glare or direct lighting while permitting illumination of the indicia through the dial plate, together with a second spacer or light shield for preventing glare to the observer due to direct light rays from the lamp.

Another object of the invention is to provide an indicating device having a novel pointer made of a suitable clear light conducting material in which a portion thereof is transparent while an opposite indicator end portion of the pointer has a triangular top cross section with an under base parallel to the surface of the dial painted optical white, while the top surfaces are rough finished as by a light sand blast so as to provide a soft diffusion of light from the indicator end portion of the pointer without harsh reflection of light rays or glare and in which the pointer is so arranged in relation to the dial and lamp housing as to be directly illuminated by the light from the lamp housing at the edge of the dial.

Another object of the invention is to provide novel means for effecting edge illumination of the indicia and pointer of an indicating device and in which the lamp housings are arranged so that the illuminating lamps may be readily accessible from the front of the indicating device and there is further provided at the back of the indicating device a readily adjustable member for varying the degree of illumination of the dial by the lamps.

The above and other objects and features of the invention will appear more fully hereinafter from a consideration of the following description taken in connection with the accompanying drawings wherein one embodiment of the invention is illustrated by way of example.

Figure 1 is a plan view of an indicating device embodying the subject invention.

Figure 2 is a cross-sectional view taken on the line 2—2 of Figure 1 and looking in the direction of the arrows.

Referring now to the drawings, there is indicated by the numeral 1 a mounting flange affixed by suitable fastening bolts 2 to the casing 3 of an indicating device. A dial 4 is positioned in the mounting flange 1 and the dial 4 includes a sheet of clear transparent light transmitting material 6, preferably plastic, of a type well known in the art and having two relatively thin layers or coats 8 and 10. The sheet 6 may be fabricated from a convenient transparent material pervious to lightrays projected inwardly from the edge thereof while the top side of the sheet 6 may be painted or coated with a thin layer 8 of translucent white which may in turn be painted or coated with a thin layer 10 of a dull opaque black, except where suitable indicia are engraved or cut in the layer 10 as indicated by numeral 11 so that light rays projected inwardly from the edge of the dial 4, as from suitable electric lamps 13 having an electrical filament 14, pervade the sheet 6 with uniform intensity so as to escape only through the indicia 11 where the opaque black layer has been cut away. Moreover since the layers or coats 8 and 10 are of contrasting colors (white and black) the indicia cut in the black layer 10 when viewed in the external light will show the white layer 8 through the cut away portions of layer 10 and present to the view of the observer an accentuated indicium of white showing through the black layer 10.

The lamps 13 are mounted in like lamp housings 16 positioned in the mounting flange 1 and at opposite sides of the indicating device. The lamp housing 16 includes a base plate 20 and an annular body portion 22 formed integral therewith of suitable electrical conducting material. The body portion 22 has an arcuate opening in which is mounted a light filter 24 of suitable material and desired color, such as identification red, which filter 24 is positioned between the lamp 13 and the object to be illuminated while an opposite interior semi-circular surface 27 of the lamp housing is highly polished so as to provide a reflector which acts to reflect the light from the filament of the lamp 13 through the filter 24.

A base 29 of the lamp 13 fits in contacting relation in an annular ring-like member 31 of suitable electrical conducting material. The base 29 provides one electrical terminal for the electric filament 14 of the lamp 13. The member 31 is in turn secured in the body portion 22 of the lamp housing 16 by suitable electrical insulating material 33 and the member 31 is electrically connected by a suitably insulated electrical conductor 35. The conductors 35 from each lamp 13 are connected together in parallel and to one terminal of a source of electrical energy or battery 37 as hereinafter explained.

The filament 14 has another electrical terminal 40 mounted in a member 42 of suitable insulating material so as to insulate the base 29 of the lamp 13 from the other filament terminal 40.

A conductor 44 is affixed at 45 by solder or other suitable fastening means to the base member 20 so as to electrically connect the base member 20 to the other terminal of the battery 37 through a conductor 46, as shown diagrammatically in Figure 2.

A cap 50 is screw threadedly engaged at 52 to the outer end of the body portion 22 of the lamp housing 16. The cap 50 carries a contact member or plate 54 which engages the terminal 40 of the lamp 13. The base member 20, body portion 22, cap 50 and contact member 54 are of electrical conducting material so as to electrically connect the other terminal 40 of the lamp filament to the battery 37 through the conductors 44 and 46.

The glass bulb end of the lamp 13 is resiliently supported by a coil spring 56 mounted between the base plate 20 and the aforenoted end of the lamp 13, as shown in Figure 2.

It will be seen from the foregoing that the lamp housings 16 are placed so as to be easily accessible from the front of the indicating device so as to facilitate the changing of the lamps 13 by the mere removal of the cap 50. Thus upon removal of cap 50 the lamp 13 may be withdrawn through the open end of the housing 16.

As shown diagrammatically in Figure 2, the conductor 35 leading from one terminal of the filaments 14 of the lamps 13 is connected by a conductor 55 leading to a terminal of a variable resistance device 57 which may be of a conventional type and then through the device 57, a conductor 58 and switch 60 to a terminal of the battery 37 opposite from that to which the conductors 46 is connected. The switch 60 may be opened and closed to control the energization of the lamps 13 while the degree of energization may be varied by adjustment of the device 57.

The variable resistance device 57 is mounted in a flange portion 63 of the casing 3 between resilient gaskets 65 and 67. The resilient gasket 67 separates the conductors 55 and 58 of the variable resistance device 57 from the conductors 35 and 44 of the lamp 13. Moreover there is provided a stem portion 69 for adjusting the variable resistance device 57. The stem portion 69 projects from the back of the indicating device and has a cleft portion 71 engageable by a screw driver so that the variable resistance device 57 may be easily adjusted and thereby the illumination of the parallel connected lamps 13 and in turn the illumination of the indicia 11 on the dial 4 and the illumination of a pointer 80 cooperating with the indicia, as hereinafter explained.

The indicia 11 of the dial 4, as heretofore explained, is illuminated by the lamps 13 through back lighting as the dial 4 is made of a light conducting material 6 of a thickness for the proper transmission of light through it from the lamps 13. The top side of the dial 4 is coated or painted with a translucent white layer 8 which is in turn coated or painted with an opaque black layer 10, except where the indicia 11 are provided therein so that the light rays enter the dial plate 4 from the lamp housing 16 through the light filter 24 so as to pervade the light conducting material 6 with uniform intensity and escaping only through the indicia openings in the layer 10 of opaque black and through the translucent white layer 8.

The pointer 80 is adjustably positioned by a metal shaft 82 connected to the pointer 80 by a metal hub portion 83. The pointer 80 is positioned through operation of the shaft 82 by suitable mechanism of the indicating device (not shown) and in cooperating relation with the indicia 11 on the dial 4, as shown in Figure 1.

The pointer 80 is illuminated by direct light rays from the lamps 13. The pointer 80 is made of a suitable clear light conducting material of a thickness giving suitable mechanical strength and light transmission. The front half 84 of the pointer 80 has a triangular cross-section with the base parallel to the surface of the dial 4. The base of the portion 84 of the pointer 80 is coated or painted with a layer 86, shown in Figure 2, of a suitable optical white material and the triangular top surfaces of the portion 84 of the pointer 80 are given a slightly roughed finish by a light sand blast to avoid harsh reflection of the light rays from the lamps 13 and provide instead a soft diffusion of the light from the lamps 13 by the portion 84 of the pointer 80. The remaining clear portion 88 of the pointer 80 is highly polished so that the observers may see through the portion 88 which is so arranged as not to obscure markings on the dial 4 as the pointer 80 is adjusted relative to the dial 4.

As shown in Figure 2, the pointer 80 is directly illuminated by the light from the lamps 13 passing through the top portion of the light filter 24 and through a transparent spacer 90. A spacer ring 92 of a suitable black opaque non-transparent material is positioned between the dial 4 and a gasket 94 likewise of a black opaque non-transparent material. Positioned between a lip portion 96 of the flange 1 and the gasket 94 is a glass cover plate 98 of clear transparent material. The spacer ring 92 is thinned down at 100 between points 102 and 104 and in front of the lamp housing 16.

In order to maintain the proper gasket 94 to dial 4 distance, the transparent spacer 90 is placed over the thinned down portion 100 of the spacer 92 between points 102 and 104. The transparent spacer 90 permits the light rays to pass from the lamp 13 and directly illuminate the pointer 80, while also serving to direct the light onto the pointer 80 from the lamp 13. The thinned down portion 100 serves as a light shield to prevent the light rays passing through the transparent spacer 90 from directly illuminating the indicia 11 and background of the dial 4 and thus eliminating glare from the dial which would otherwise result upon direct lighting of the indicia 11 and background of the dial 4 by the lamps 13.

A portion 110 of the gasket 94 also serves as a light shield to prevent stray light from the lamps 13 from causing glare to the observer.

Counters 114 may be seen through an opening 116 cut in the dial 4. The counters 114 are illuminated by placing the same slightly below the level of the dial face and within the opening 116 so as to allow light passing through the dial 4 from lamps 13 at the edge thereof to fall on the exposed surface of the counter. To achieve such illumination and to eliminate stray light the sides 118 of the openings 116 are beveled, as shown in Figures 1 and 2. The counters 114 are rotatably adjusted in a conventional manner by suitable mechanism of the indicating device (not shown).

Although only one embodiment of the invention has been illustrated and described, various changes in the form and relative arrangements of the parts may be made to suit requirements.

We claim:

1. In indicating apparatus of the type including a housing, a light-conducting dial having an indicium on a surface thereof, a pointer member mounted in front of said surface, means for producing relative movement between said pointer and said indicium, at least one lamp mounted at the edge of said dial for directing certain light rays from said lamp into the edge of the dial for effecting indirect illumination of said indicium by internal transmission of said last-mentioned light rays through said dial, and means for dividing the light rays from said lamp so that other light rays from said lamp pass across in front of said dial surface to strike said pointer member to illuminate said pointer member directly, said light-dividing means including a portion projecting out in front of said dial surface for shielding said indicium and its background dial surface from direct illumination by light rays coming directly from said lamp, whereby glare from said indicium and its background dial surface is substantially eliminated.

2. In indicating apparatus of the type including a housing, a light-conducting dial having indicia on a surface thereof, a pointer member mounted in front of said surface, means for providing relative movement between said pointer and said indicia, at least one lamp mounted at the edge of said dial for directing certain light rays from said lamp into the edge of the dial for effecting indirect illumination of said indicia by internal transmission of said last-mentioned light rays through said dial, a transparent cover supported by said housing for covering said dial and pointer member, means including a ring-like member for spacing said dial from said cover, said ring-like member having a section of reduced thickness adjacent to said lamp for dividing the light rays from said lamp so that other light rays from said lamp pass across in front of said dial surface to strike said pointer member to illuminate said pointer member directly, said section having a portion projecting out in front of said dial surface for shielding said indicia and the background dial surface for said indicia from direct illumination by light rays coming directly from said lamp, whereby glare from said indicia and the background dial surface for said indicia is substantially eliminated.

3. In indicating apparatus of the type including a housing, a light-conducting dial having indicia on a surface thereof, a pointer member mounted in front of said surface, means for providing relative movement between said pointer and said indicia, at least one lamp mounted at the edge of said dial for directing certain light rays from said lamp into the edge of the dial for effecting indirect illumination of said indicia by internal transmission of said last-mentioned light rays through said dial, a transparent cover supported by said housing for covering said dial and pointer member, means including a pair of ring-like members for spacing said dial from said cover, one of said ring-like members being positioned to shield said cover from stray light rays from said lamp, the other of said ring-like members having a section of reduced thickness adjacent to said lamp for dividing the light rays from said lamp so that other light rays from said lamp pass across in front of said dial surface to strike said pointer member to illuminate said pointer member directly, said section having a portion projecting out in front of said dial surface for shielding said indicia and the background dial surface for said indicia from direct illumination by light rays coming directly from said lamp, whereby glare from said indicia and the background dial surface for said indicia is substantially eliminated.

References Cited in the file of this patent

UNITED STATES PATENTS

| | | |
|---|---|---|
| 2,009,209 | Scantlebury | July 23, 1935 |
| 2,051,288 | Curtis | Aug. 18, 1936 |
| 2,083,924 | Scantlebury | June 15, 1937 |
| 2,278,520 | Klein et al. | Apr. 7, 1942 |
| 2,290,278 | Failla | July 21, 1942 |
| 2,317,182 | Dickson | Apr. 20, 1943 |